UNITED STATES PATENT OFFICE.

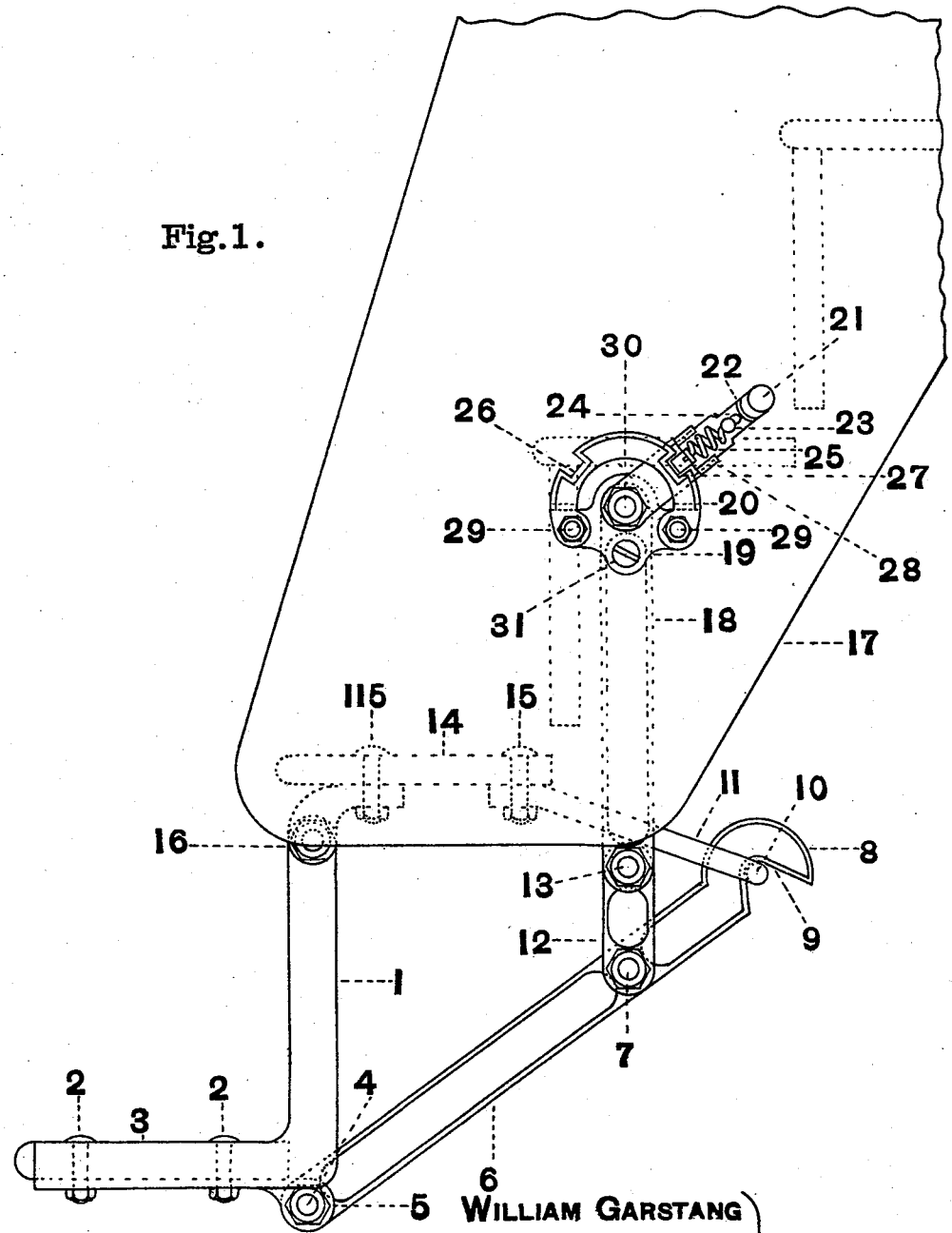

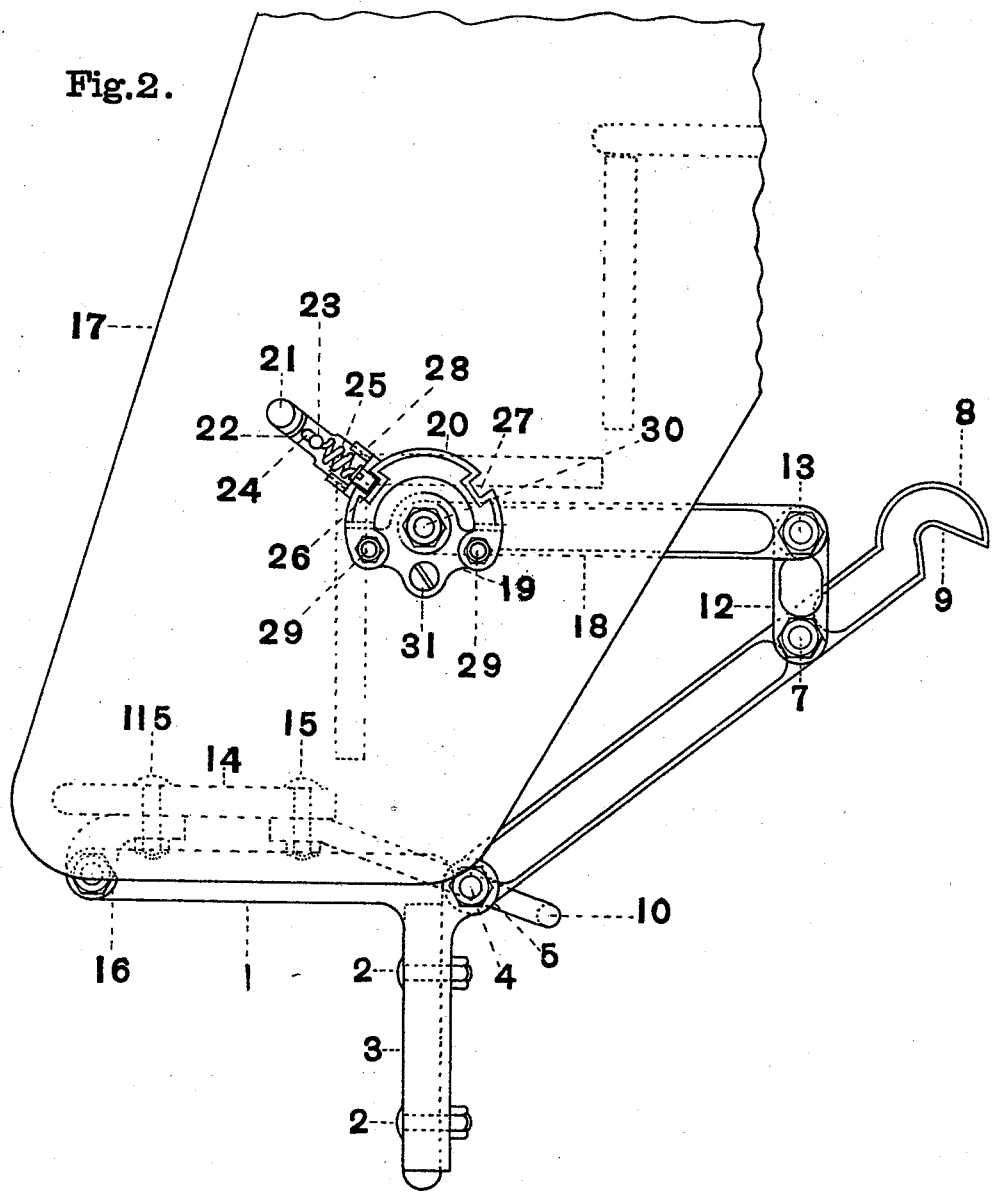

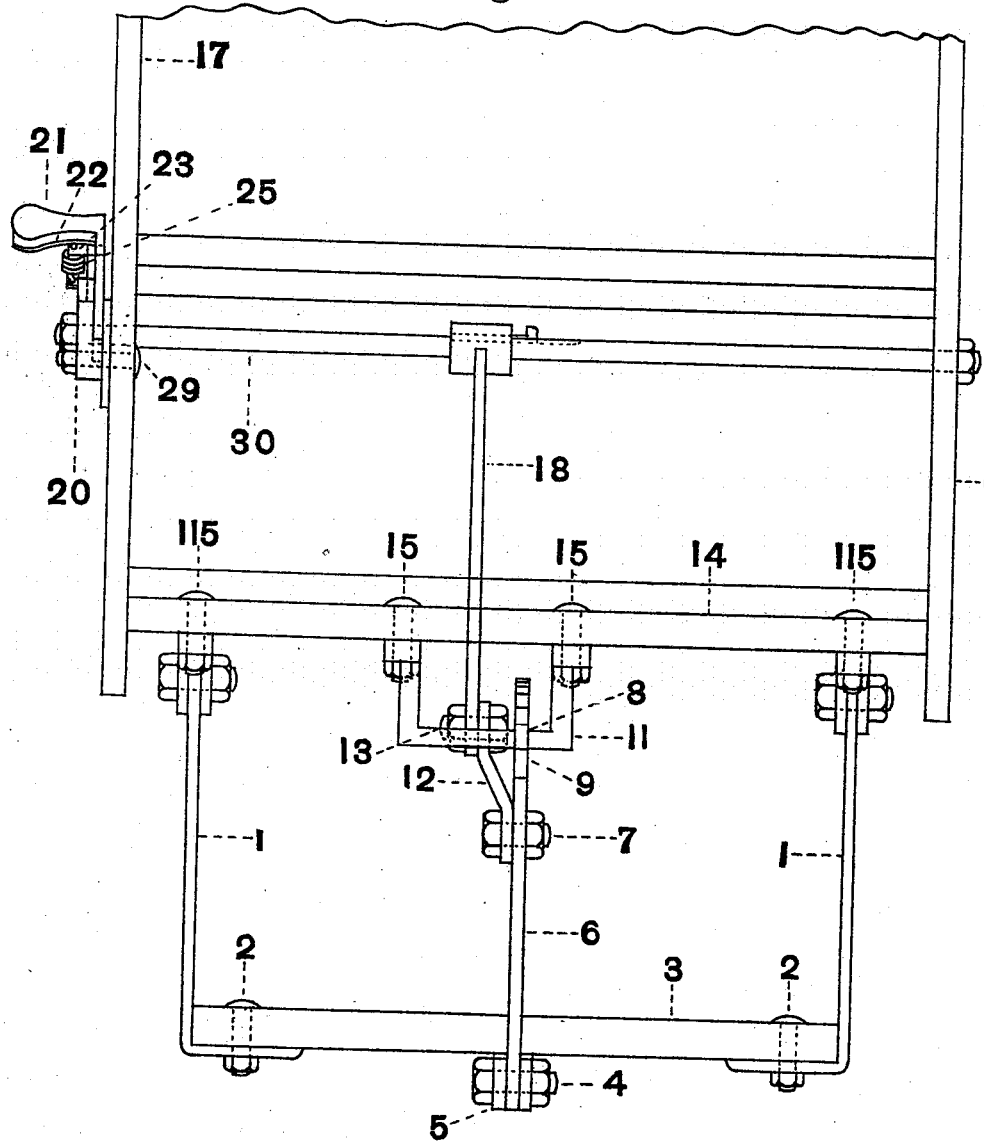

WILLIAM GARSTANG AND MASON RICKERT, OF INDIANAPOLIS, INDIANA.

REVOLVING EXTENSION PASSENGER-CAR STEP.

SPECIFICATION forming part of Letters Patent No. 588,417, dated August 17, 1897.

Application filed May 29, 1897. Serial No. 638,754. (No model.)

*To all whom it may concern:*

Be it known that we, WILLIAM GARSTANG and MASON RICKERT, citizens of the United States, residing at Indianapolis, in the county of Marion and State of Indiana, have invented a new and useful Improvement in Revolving Extension Passenger-Car Steps, as set forth in the annexed specification.

Our invention relates to steps for passenger-cars, and has for its object the provision of an extra step that may be brought into use at stations where there are no platforms or where the distance from the step is so great as to cause inconvenience to passengers stepping on or off cars, and by the simple arrangement of levers and rod the object is accomplished of raising and carrying back the extra step, so as to protect it against accident.

In the drawings, Figure 1 is a side view of the step and a part of the steps leading to the passenger-car with the step lowered ready for use. Fig. 2 is a side view of the step raised and carried back out of use. Fig. 3 is a rear view of the step when in use, as shown in Fig. 1.

Similar numerals of reference indicate corresponding parts in all the figures of the drawings.

1 designates the side supports for the revolving step; 2, the bolts that secure the side support to the step; 3, the extra revolving step; 4, the bolt that connects the locking-lever to the support; 5, the support; 6, the locking-lever; 8, the hook-shaped point of the locking-lever 6; 9, the V-shaped opening in the lever 6; 10, the round part of the locking-stirrup; 11, the locking-stirrup; 12, the connecting-link between the locking-lever 6 and the lifting-link 18; 14, the fixed step; 15, the bolt that secures the stirrup 11 to the fixed step 14; 16, the supports for the side support or hanger 1; 115, the bolt securing the support 16 to the fixed step 14; 17, the side support for the fixed steps; 18, the lifting-link, secured to the connecting-link 12 at one end by the bolt 13 and to the rod 30 at the other end; 19, the plate fitted against the side support and forming a bearing for the rod 30, the lever 21, and the quadrant 20; 26, the quadrant-stop for holding the lever 21 in a fixed position; 21, the lever for shifting the revolving step; 22, the slide for holding the lever 21 at the openings in the quadrant; 23, the pin securing the slide 22 to the lever 21; 24, the slot in the slide 22 in which the pin 23 works; 25, the spring, secured at one end by passing into the pin 23 and at the other end by passing into the projection on the slide 22; 28, the bent portions of the sides of the lever 21, bent round the sides of the slide 22, thereby forming a holder and bearing for the slide 22; 26 and 27, the notched openings in the quadrant for the reception of the slide 22; 29, the bolts, passing through the quadrant 20, the plate 19, and the side supports 17; 30, the rod, having its bearing at either end in the side supports 17 and the plate 19 and having secured thereto at one end the lever 21 and in the middle the shifting lever 18.

The operation of the revolving extension passenger-car step is as follows: When it is desired to raise the step into the unused position shown in Fig. 2, the slide 22 is pressed to the handle of the lever 21 by grasping the hand around both, and by this operation the slide is moved out of the opening 27 in the quadrant 20 and the lever is then free to be revolved to the opening 26, and in moving the lever 21 from the opening 27 to the opening 26 the lever 21, being rigidly secured to the rod 30, and the shifting link 18, also being rigidly secured to the rod 30, cause the shifting link 18 to move backward, describing a circle, and as it starts it causes the connecting-link 12 to revolve on the bolt 13 and follow the circle described by the shifting link 18, and the connecting-link 12, being secured to the locking-lever 6 by the bolt 7, raises the locking-lever 6 out of the stirrup 11, thereby releasing its hooked portion 9 from the round part 10 of the stirrup and passes backward. The locking-lever 6 being secured to the hanger 5 by the bolt 4 and the hanger 5 being secured to the extra step 3 by the bolts 2 cause the step to move back and up, revolving on the bolt, securing it to the hanger 16, and in this operation it moves back to the position shown in Fig. 2 during the time the lever 21 passes from the opening 27 in the quadrant to the opening 26 in said quadrant.

To move the extra step from its unused position, as shown in Fig. 2, to the position shown in Fig. 1, the lever 21 is moved, as described heretofore, from the opening 26 to the opening 27, and during the time it passes from 26 to 27 the extra step 3 will move into the position shown in Fig. 1 by means of the shifting links and lever heretofore described.

Having thus described our invention, what we claim, and desire to secure by Letters Patent, is—

1. The combination of the revolving step 3 secured to the hanging support 1 by the bolts 2 and secured to the fixed step by the hanger 16 and the bolt 115, having secured thereto the hanger 5, pivoted thereto the locking-lever 6, the connecting-link 12, the shifting link 18, the rod 30, the lever 21, the slide 22, the quadrant 20, and the bearing-plate 19, whereby when the lever 21 is turned the step 3 will revolve beneath the fixed step of a passenger-coach, substantially as specified.

2. The combination of the revolving step 3 having secured thereto the hanger 5, pivoted thereto the locking-lever 6, with the hook-shaped end 8 and the V-shaped opening 9 therein, substantially as shown and described.

3. The combination of the extra step 3 the hanger 5 the locking-lever 6 and the stirrup 11 having the round portion 10 adapted to fit in the V-shaped opening of the locking-lever 6, substantially as shown and described.

4. The combination of the connecting-link 12 pivoted to the locking-lever 6 at one end and pivoted to the shifting lever 18 at the other end and so arranged that the connecting-link 12 will lock and hold the V-shaped opening in the lever 6 into the round part 10 of the stirrup 11, substantially as shown and described.

5. The combination of the connecting-link 12 and the shifting link 18 rigidly secured to the rod 30 so the revolving of the lever 21 will cause the shifting link 18 to describe a circle and thus unlock the locking-lever 6, substantially as described.

6. The combination of the locking-lever 6 and the connecting-link 12 the shifting link 18 and the stirrup 11 so arranged that the hooked portion 9 of the locking-lever 6 is held down and locked on the stirrup 11 at the point 10 when the lever 21 is shifted to the notch 27 in the quadrant 20, substantially as shown and described.

7. The combination in a rotating extension passenger-car step, of the extra step 3, the locking-lever 6, the connecting-link 12, the shifting link 18, the rod 30, the lever 21, the slide 22, the quadrant 20, the bearing-plate 19, substantially as shown and described.

In testimony that we claim the foregoing as our own we have hereunto affixed our signatures in the presence of two witnesses.

WILLIAM GARSTANG.
MASON RICKERT.

Witnesses:
W. G. TAYLOR,
D. Y. BYRKIT.